United States Patent [19]
Lindskog

[11] 3,808,656
[45] May 7, 1974

[54] ADJUSTABLE CUTTING TOOL
[75] Inventor: Bo Gosta Lindskog, Sandviken, Sweden
[73] Assignee: Sandvik Aktiebolag, Sandviken, Sweden
[22] Filed: Apr. 2, 1973
[21] Appl. No.: 346,819

[30] Foreign Application Priority Data
Apr. 10, 1972 Sweden.............................. 4584/72

[52] U.S. Cl..................................... 29/106, 408/57
[51] Int. Cl............................................ B23p 15/30
[58] Field of Search .................. 29/106; 408/57, 59

[56] References Cited
UNITED STATES PATENTS
2,550,645  4/1951  Retz..................................... 29/106
2,640,378  6/1953  Haggar................................. 408/57
3,460,410  8/1969  Briles................................... 408/57

Primary Examiner—Leonidas Vlachos
Attorney, Agent, or Firm—Pierce, Scheffler & Parker

[57]   ABSTRACT

The invention concerns an adjustable cutting tool having cooling or flushing medium supply directed to the cutting insert.

6 Claims, 8 Drawing Figures

ADJUSTABLE CUTTING TOOL

The present invention relates to machine tools for internal cutting, e.g., as boring and turning bars, with interchangeable and adjustable cutting heads or the like.

In cutting, e.g., in turning, of inside surfaces, troubles arise because of so-called "chip pressing," that is to say, that chips are pressed between the tool itself and the machined surface thereby causing scratched and wavy surfaces. This can usually be remedied by directing a jet of air, water or other medium to the critical zone. In many cases, however, it is very difficult to arrange this practically, because of limited space. Supply of cooling medium is usually desirable because surface finish, tolerances and tool life in machining will often be influenced in a favorable direction.

There heretofore was known a large group of tools for internal cutting, e.g., for turning, drilling and the like, in which it has been attempted to solve the supply of cooling or washing medium in different ways. In tools having adjustable cutting heads it has been a problem, however, to obtain satisfactory supply of cooling medium in the whole setting range of the head.

According to the present invention, a tool is now available which solves the mentioned problem in a simple way and fulfills widely different demands.

Certain embodiments of the invention will now be described with reference to the accompanying drawings, in which:

FIGS. 4–8 show another embodiment of a cutting tool (a turning bar) according to the invention, in which:

FIG. 4 is a side elevational view of the tool,

Figure 1:
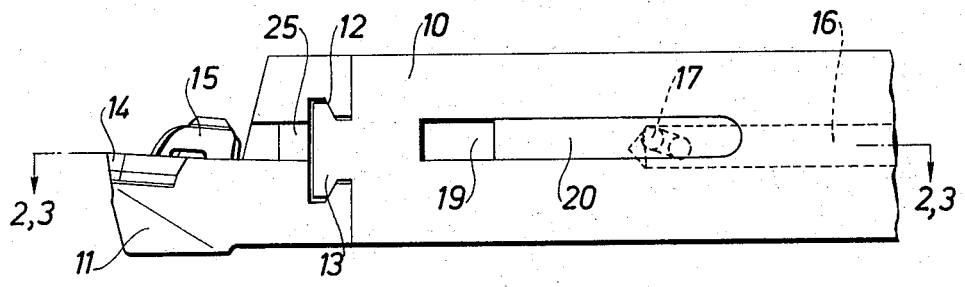
FIG. 1 is a side elevational view of a turning bar embodying principles of the invention.
Figure 2:
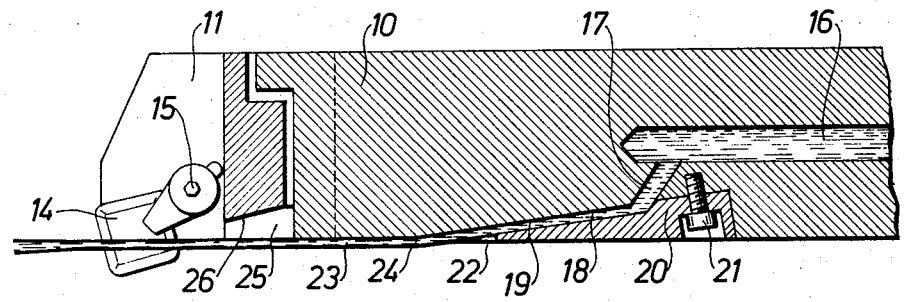
FIG. 2 is a horizontal sectional view taken along the lines 2.3—2.3 in FIG. 1 (with the exception of clamping means for the insert)
Figure 3:
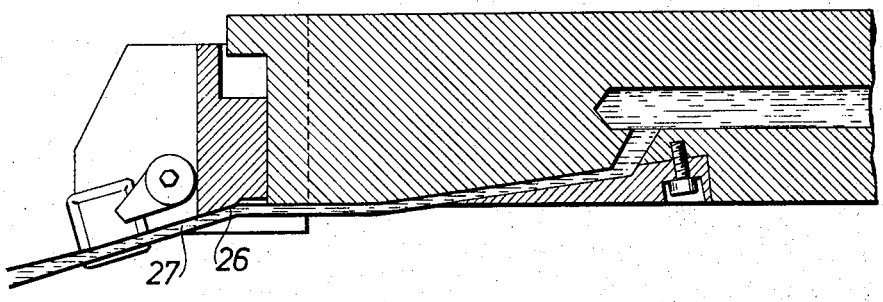
FIG. 3 is a horizontal sectional view taken along the lines 2.3—2.3 in FIG. 1, with a changed position of the cutting head compared to FIG. 2.
Figure 4:
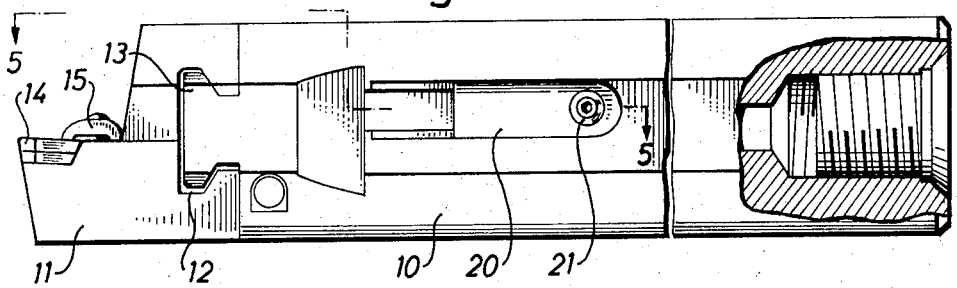
Figure 5:
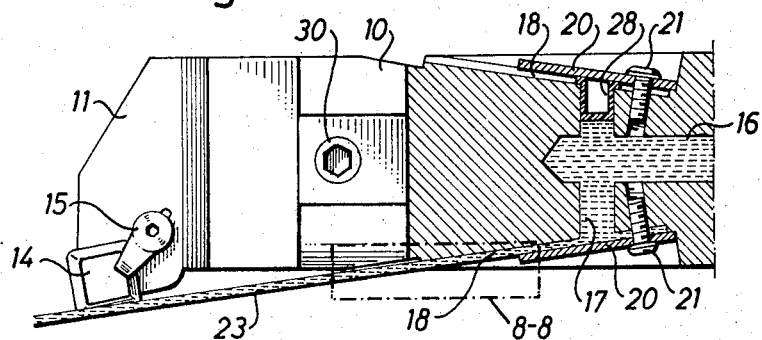
Figure 6:
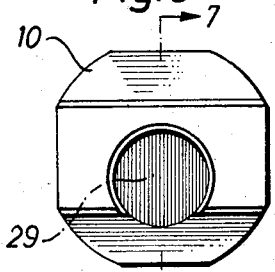
Figure 7:
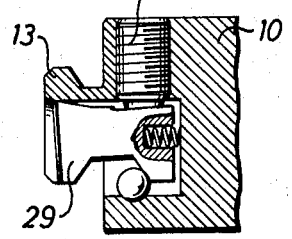
Figure 8:
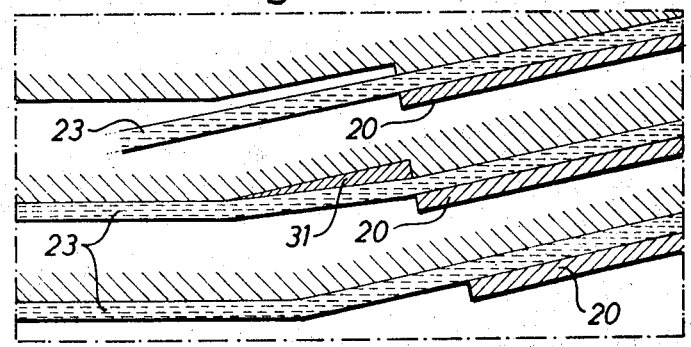

FIG. 5 is a horizontal, partly sectional, view taken along the line 5—5 in FIG. 4, FIG. 6 is a front view of the bar (the cutting head not shown), FIG. 7 is a horizontal sectional view taken along the line 7—7 in FIG. 6, and FIG. 8 is an enlarged schematic sectional view of part of FIG. 5 (the area 8—8) showing different alternatives.

The tool shown in FIGS. 1–8 consists of a bar 10 and a cutting head 11 applied to the front end of the bar. The cutting head is adjustable in radial direction. In the embodiment shown, in order to obtain a slidable mounting, the cutting head is provided with a groove 12 surrounding a corresponding tenon or tongue 13 of the bar. On the cutting head an insert 14 is held by clamping means 15.

Bar 10 is provided with a channel for supply of cooling and flushing medium, the same consisting of several connecting parts as holes 16, 17 in the bar, and a slot 18 formed by a cut 19 in the bar 10, and a tongue or plate 20 placed in the cut. The tongue is held by a screw 21 in the embodiment shown.

The cooling medium is transported out of the envelope surface (22) of the bar by means of the outer parts 17, 18 of the channel. The tool is characterized in that the inclination of the slot 18 in relation to the longitudinal axis of the bar is so small that the cooling medium 23 follows mainly the envelope surface of the bar and in certain embodiments of the tool deviates in the slot opening 24 to move essentially parallel with the bar. This makes flushing over the insert 14 possible when the head 11 is in its inner position (see FIG. 2).

On the actual side the cutting head 11 there is provided a cut 25 enabling the cooling medium to pass when the head is adjusted in certain ranges. Furthermore, the front end 26 of the cut 25 is so formed that it steers the cooling medium jet 27 toward the insert at the outer positions of the cutting head.

It has been found to be advantageous, regarding chip removal, etc., to increase the speed of the cooling medium by giving the slot 18 a smaller sectional area than the preceding parts of the cooling medium channel, i.e., the holes 16, 17. In order to make the cooling (or, flushing) medium mainly follow the envelope surface of the bar after leaving the channel, the slot 18 should have an inclination — in relation to the longitudinal axis of the bar — smaller than 15°, and preferably at the most 10°. For practical reasons the inclination should be at the least 5°.

Among the advantages of the tool according to the invention, compared to several other earlier know constructions, is the feature that the cooling medium is supplied without any outer arrangements of tubing or the like. Furthermore, the tool works satisfactorily in the whole setting range of the cutting head without adjustments. The head may as well be changed to another type without adjustments of the cooling system. It is thus essential that the cooling or flushing medium jet can effectively transport chips away from the critical area around the insert in the whole working range of the tool.

The embodiment according to FIGS. 4–8 can be used for both right- and left-hand design of the cutting head. A movable plug 28 is inserted in the "unused" channel. The cutting head is held by means of a lever 29 affected by a screw 30.

In certain cases it is desirable that the jet maintains essentially the same direction as had been obtained in the outer part of the cooling medium channel. An adjustment may easily be effected by, for example, removing a wedge-formed part 31 from the area where the jet leaves the channel. In such cases there is normally no adherence between the jet and the envelope of the bar after the jet has left the channel.

I claim:

1. Tool for internal cutting consisting of a bar (10) and a cutting head (11) applied to the front end of the bar, said cutting head being adjustable in radial direction and having an attached cutting insert (14), and said bar (10) containing a channel for supply of cooling or flushing medium, the channel consisting of connected parts (16, 17, 18) characterized in that the outer part (18) of said channel emerges at the envelope surface (22) of the bar and has such a small inclination in relation to the bar (10) and is so directed that the cooling or flushing medium jet (23) after leaving the outer part (18) of the channel follows essentially said envelope surface (22) and is directed forwards to the insert (14).

2. Cutting tool according to claim 1, in which the cutting head (11) is so formed that it can divert the jet (23, 27) in outer positions and direct it towards the insert (14) particularly to the area of chip-inclination and chip-formation.

3. Cutting tool according to claim 1, in which the outer part (18) of the channel is shaped as a slot formed by a cut (19) in the bar (10) and a tongue (20) applied in the cut (19).

4. Cutting tool according to claim 1, in which the slot or outer part (18) of the channel has a smaller sectional area than inner parts (16, 17) of the channel.

5. Cutting tool according to claim 1, in which the inclination of the slot or outer part (18) of the channel in relation to the longitudinal axis of the bar is smaller than 15°, preferably at the most 10°, and preferably greater than 5°.

6. Cutting tool according to claim 1, in which in order to obtain free passage respectively steering of the jet (23, 27), the cutting head (11) is provided with a cut (25) having a front, out-turned edge (26).

* * * * *